US012352051B2

(12) United States Patent
Liang et al.

(10) Patent No.: US 12,352,051 B2
(45) Date of Patent: Jul. 8, 2025

(54) MULTIFUNCTIONAL ELECTRIC LOUVERED AWNING

(71) Applicant: Yotrio Group Co., Ltd., Linhai (CN)

(72) Inventors: Li Liang, Linhai (CN); Jianqiang Xie, Linhai (CN)

(73) Assignee: Yotrio Group Co., Ltd., Linhai (CN)

( * ) Notice: Subject to any disclaimer, the term of this patent is extended or adjusted under 35 U.S.C. 154(b) by 276 days.

(21) Appl. No.: 18/141,471

(22) Filed: May 1, 2023

(65) Prior Publication Data

US 2024/0003136 A1 Jan. 4, 2024

(51) Int. Cl.
*E04F 10/10* (2006.01)

(52) U.S. Cl.
CPC ................... *E04F 10/10* (2013.01)

(58) Field of Classification Search
CPC .. E04F 10/10; E04F 10/08; E04B 7/16; E04B 7/166
See application file for complete search history.

(56) References Cited

U.S. PATENT DOCUMENTS

| 11,015,349 B2 * | 5/2021 | Byszenski | E04F 10/10 |
| 11,156,014 B1 * | 10/2021 | He | E04F 10/02 |
| 2017/0336104 A1 * | 11/2017 | Tenghoff | E04F 10/00 |
| 2021/0010270 A1 * | 1/2021 | Zhao | E04B 1/163 |
| 2021/0262237 A1 * | 8/2021 | Vanthournout | E04F 10/08 |

FOREIGN PATENT DOCUMENTS

| CN | 205617895 U | * | 10/2016 | | E04F 10/10 |
| CN | 110130593 A | * | 8/2019 | | E04B 1/66 |
| CN | 211115687 U | * | 7/2020 | | |
| CN | 213062655 U | * | 4/2021 | | E04F 10/10 |

* cited by examiner

*Primary Examiner* — Beth A Stephan
(74) *Attorney, Agent, or Firm* — Jingming (James) Cai; SAC Attorneys LLP (57) ABSTRACT

A multifunctional electric louvered awning including a ring beam frame, leg pipes for supporting the ring beam frame, and a louvered canopy, is provided. The ring beam frame includes first ring beams and second ring beams for connecting the first ring beams on both sides. Each first ring beam includes upper and lower ring beams. The upper ring beam is fixed to a clamping part of the lower ring beam. The louvered canopy is installed on the first ring beams and includes multiple louver boards arranged in sequence and a drive assembly for opening and closing the louver boards. The drive assembly includes a telescopic motor and a linkage rod. The telescopic motor is suspended from a bottom surface of the clamping part through a mounting base. The linkage rod is connected to a telescopic end of the telescopic motor to link with the louver boards.

10 Claims, 7 Drawing Sheets

MULTIFUNCTIONAL ELECTRIC LOUVERED AWNING

CROSS-REFERENCE TO RELATED APPLICATIONS

This application claims priority to and the benefit of the patent application titled "Multifunctional electric louvered awning", application number 202221676805.4, filed in the China National Intellectual Property Administration on Jul. 1, 2022. The specification of the above-referenced patent application is incorporated herein by reference in its entirety.

FIELD OF THE INVENTION

The present invention, in general, relates to outdoor awnings, and in particular, relates to a multifunctional electric louvered awning.

BACKGROUND

With the rapid development of the economy and the improvement of people's living standards, people's pursuit of a quality of life is increasing, and outdoor tents are increasingly being widely used for leisure and entertainment. At present, there are many kinds of tents in the market. The tents are categorized into several types according to type, size, material, and color. Different types of tents have different uses. However, most of the existing tents have fixed ceilings. Although various materials such as cloth, iron sheet materials, and sun shields, are used in these tents, these materials only achieve a fixed mode of shading or light transmission, and do not allow users to adjust the light as they wish to enjoy the sun and the sky outside.

For this reason, for example, in Chinese patent publication number CN205617895U, a louver ceiling structure of a tent is disclosed. This louver ceiling structure includes a first ring beam, a second ring beam, and multiple louver blades arranged between the first ring beam and the second ring beam. The first ring beam is sequentially hinged with a plurality of first blade fixing parts, where each first blade fixing part is connected by linkage strips. The second ring beam is sequentially hinged with a plurality of second blade fixing parts, where each second blade fixing part is connected by linkage strips. One end of each louver blade is connected to a first blade fixing part, and the other end is connected to a second blade fixing part. The louver ceiling structure also includes a rotating mechanism for driving the first blade fixing part or the second blade fixing part to rotate. When the first blade fixing part or the second blade fixing part rotates, the louver blades can be opened and closed.

In another example, Chinese patent publication number CN21115687U discloses a louver board assembly with a quick-mounting structure, including a plurality of louver boards and a frame. Each louver board is provided with a louver board installation part. The louver board installation part is installed in cooperation with one end of the louver board quick-mounting assembly, and the other end of the louver board quick-mounting assembly is hinged in cooperation with frame clamps. The frame clamps are fixedly installed on the frame.

In another example, Chinese patent publication number CN110130593B discloses a louver awning with a waterproof quick-mounting structure. This louver awning comprises a louver board assembly and a frame. The louver board assembly comprises a plurality of louver boards arranged in sequence, a linkage rod for linking the plurality of louver boards, and a louver board quick-mounting assembly that matches with the frame. Each louver board comprises a louver board body, a drainage hanging bucket located on the sides of the louver board body, and a waterproof strip installed on the louver board body. One end of the louver board quick-mounting assembly is installed in cooperation with the louver board, and the other end is installed in cooperation with a frame clamp. The frame clamp is fixed on the frame.

In Chinese patent publication number CN213062655U, a long louvered canopy top clamping structure for a louver awning is disclosed. The long louvered canopy top clamping structure comprises a cross beam and a louver board mounted on the cross beam in a matched manner through a mounting assembly. The mounting assembly comprises a louver board fixing seat and a louver board rotating piece. One end of the louver board fixing seat is clamped in cooperation with a cross beam, and the other end is hinged with the louver board rotating piece. The louver board rotating piece is clamped in cooperation with the louver board.

In the above-mentioned structures, the opening and closing operation of the louver blades or the louver boards is usually a manual operation, which affects their use, especially in thunderstorms, showers, and other weather. Because the louvered canopy closes slowly due to the manual operation, the bottom of the louver awning gets wet easily, thereby affecting the overall use. In addition, the sides of the existing louver awning are usually open, thereby creating an open internal space in the louver awning. In an environment with heavy rain, water is collected inside the louvered canopy. Moreover, power supply is usually not available inside existing louver awnings, which leads to the need for an external light source during their use at night.

SUMMARY OF THE INVENTION

To address the above-mentioned problems, the present invention discloses a multifunctional electric louvered awning, which optimizes the structure of an awning frame, facilitates the assembly of a louvered canopy, adds different functional installation areas, increases the product use effect, and expands the functionality of the product.

The multifunctional electric louvered awning disclosed herein comprises an awning frame and a louvered canopy. The awning frame includes a ring beam frame and multiple leg pipes for supporting the ring beam frame. The ring beam frame includes first ring beams and second ring beams. Each of the first ring beams includes a first upper ring beam and a first lower ring beam. The first lower ring beam includes a clamping part, an outer wall, a bottom plate, and an inner wall. The first upper ring beam is fixed to an upper surface of the clamping part of the first lower ring beam. The second ring beams are configured to connect the first ring beams on both sides of the first ring beams. The louvered canopy is installed on the first ring beams of the ring beam frame of the awning frame. The louvered canopy includes a plurality of louver boards arranged in sequence and a drive assembly for opening and closing the louver boards. The louver boards are installed on the first upper ring beam of each of the first ring beams. The drive assembly is installed in the first lower ring beam. The drive assembly includes a telescopic motor and a linkage rod. The telescopic motor is suspended from a bottom surface of the clamping part of the first lower ring beam through a mounting base. The linkage rod is connected to a telescopic end of the telescopic motor. The linkage rod is configured to link with the plurality of louver boards.

The inner wall of the first ring beams and/or the second ring beams is provided with a light bar groove for installing light emitting bodies.

The clamping part, the outer wall, the bottom plate, and the inner wall of the first lower ring beam together form a drainage groove cavity. A height of the inner wall is smaller than a height of the outer wall. The inner wall is disposed proximal to a center of an end surface of a louver board body of each of the louver boards.

Each of the louver boards comprises a louver board body and connecting pieces located at both ends of the louver board body. Each of the connecting pieces is provided with a rotating shaft and a shaft sleeve sleeved on the rotating shaft. The shaft sleeve is configured to cooperate with a rotating shaft hole installed on an inner wall of the first upper ring beam of each of the first ring beams.

The multifunctional electric louvered awning further comprises a clamping piece mounted on the rotating shaft. The clamping piece is configured to limit movement of each of the louver boards in the axial direction, and to complete an installation of each louver board to the first upper ring beam of each of the first ring beams on both sides.

The multifunctional electric louvered awning further comprises a rain sensor installed on an outer surface of the awning frame. The rain sensor is connected to a controller by a wired connection or a wireless connection. The controller is configured to control and drive the telescopic motor of the drive assembly.

The multifunctional electric louvered awning further comprises a door frame assembly including a door frame unit and a door panel unit installed on the door frame unit. The door frame unit includes a sky rail on an upper end of the door frame unit, a ground rail on a bottom end of the door frame unit, and side frames on both sides of the door frame unit. The door panel unit is configured to slide along the sky rail and the ground rail of the door frame unit.

The door panel unit includes a door panel frame and a door panel body installed in the door panel frame. The door panel frame includes a door panel horizontal frame and a door panel vertical frame. The door panel horizontal frame is configured to slidingly match with the sky rail and/or the ground rail of the door frame unit.

The door panel unit further comprises a door lock provided between two adjacent door panel vertical frames.

The side frames of the door frame unit are fixedly matched with the leg pipes of the awning frame through fasteners.

The present invention optimizes the design of the awning frame structure, adds different functional installation areas, adopts upper and lower ring beam assembly structures, facilitates the assembly of the louvered canopy, increases the overall height of the ring beams, and increases the assembly space of other components. Moreover, the telescopic motor is assembled with a suspension structure, which protects the telescopic motor from rainwater and increases the protection effect. Furthermore, the light bar groove facilitates the installation of the light emitting bodies and improves the light sensation inside the multifunctional electric louver awning. With the door frame assembly, a closed space is formed to improve usability.

To understand the characteristics of the present invention, refer to the drawings and the following detailed description.

In the figures: 100. Multifunctional electric louvered awning; 101. Awning frame; 1. Louvered canopy; 1a. Louver boards; 11. Louver board body; 12. Connecting piece; 121. Shaft sleeve; 122. Clamping piece; 123. Rotating shaft; 201. Drive Assembly; 13. Linkage rod; 14. Telescopic motor; 15. Mounting base; 102. Ring beam frame; 2. First ring beam; 21. First upper ring beam; 211. Rotating shaft hole; 22. First lower ring beam; 221. Clamping part; 222. Outer wall; 223. Bottom plate; 224. Inner wall; 225. Drainage groove cavity, 23. Light bar groove; 4. Leg pipe; 5. Rain sensor; 103. Door frame assembly; 6. Door frame unit; 61. Sky rail; 62. Ground rail; 63. Side frame; 7. Door panel unit; 71. Door panel body; 72. Door panel vertical frame; 73. Door panel horizontal frame; 74. Door lock; 75. Door panel frame; 8. Controller; and 9. Light emitting body.

DETAILED DESCRIPTION OF THE INVENTION

To make the technical means, creative features, purposes achieved, and effects of the present invention easy to understand, the following is a further elaboration of the present invention combined with specific implementation methods.

It should be noted that all the directional references (such as up, down, left, right, front, back, etc.) in the embodiments of the present invention are only used for explaining relative position relationships, movement conditions, and the like, between all parts under a particular perspective (shown in the drawings), and when the particular perspective changes, the directional references also correspondingly change accordingly. In addition, the terms "first", "second", etc., disclosed in the present invention are only used for descriptive purposes, and cannot be interpreted to indicate or imply relative importance or implicitly indicate a number of the indicated technical features. Thus, features defined as "first" and "second" may explicitly or implicitly comprise at least one feature.

Figure 1:
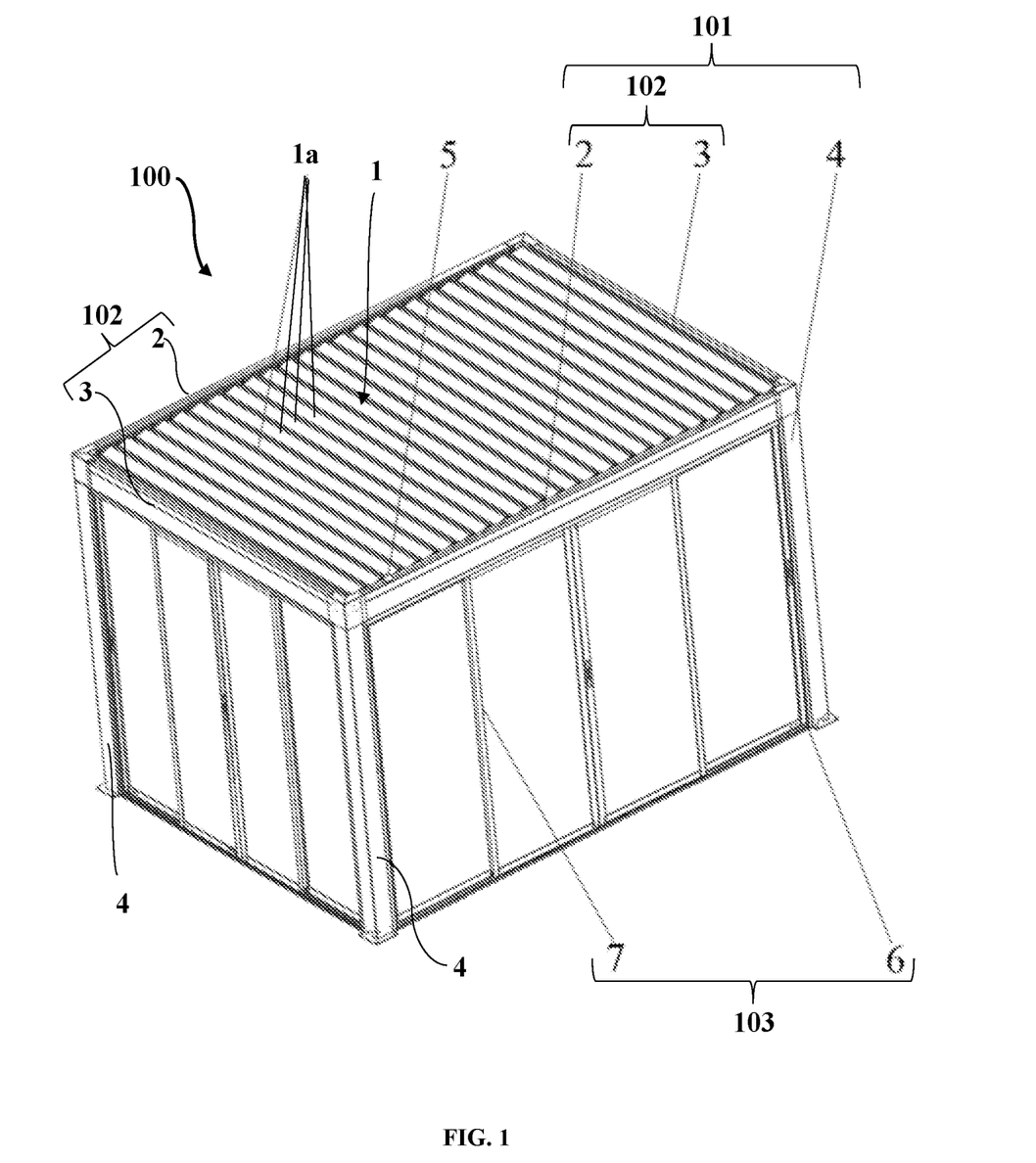
FIG. 1 is a structural diagram of a multifunctional electric louvered awning.
Figure 2:
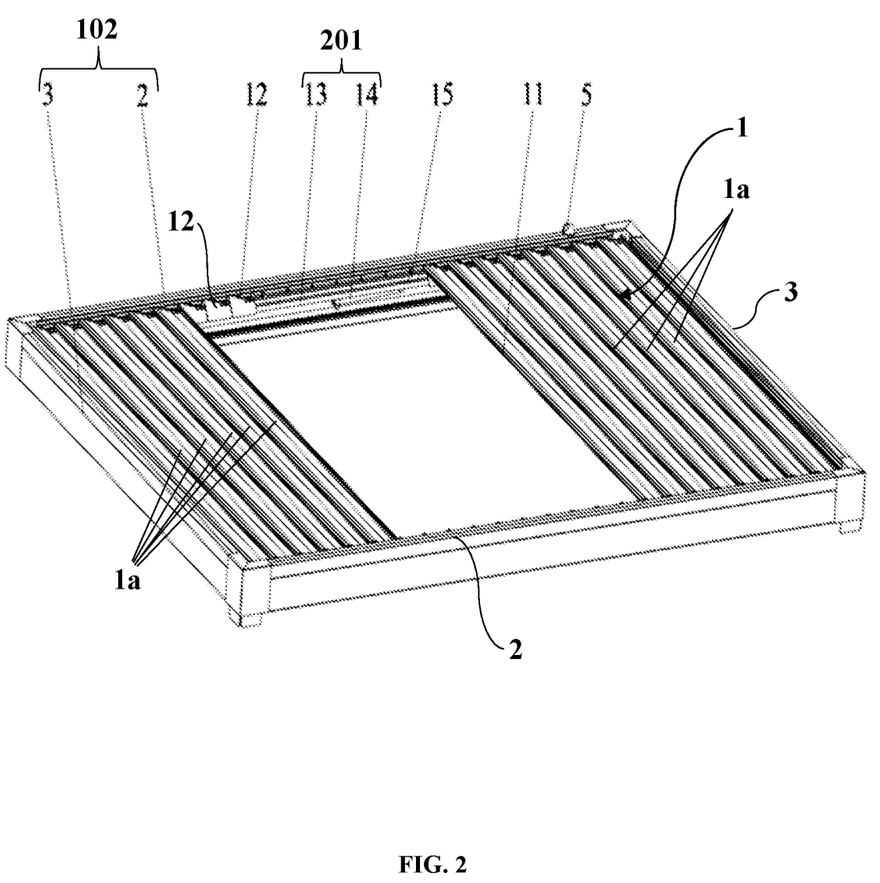
FIG. 2 is a structural diagram of a louvered canopy and a ring beam frame of the multifunctional electric louvered awning.

An embodiment of a multifunctional electric louvered awning 100 is shown in FIG. 1. The multifunctional electric louvered awning 100 comprises an awning frame 101 and a louvered canopy 1. The awning frame 101 includes a ring beam frame 102 and multiple leg pipes 4 for supporting the ring beam frame 102. The ring beam frame 102 includes first ring beams 2 and second ring beams 3. The second ring beams 3 are configured to connect the first ring beams 2 on both sides of the first ring beams 2 as shown in FIGS. 1-2, where, in an embodiment, the first ring beams 2 and the second ring beams 3 form a square-shaped ring beam frame 102. In another embodiment, the first ring beams 2 and the second ring beams 3 are configured to form a digital number eight-shaped ring beam frame, a Chinese character "日"-shaped ring beam frame, etc. According to design requirements, a number of first ring beams 2 and second ring beams 3 can be connected freely based on the ring beam frame structure. The louvered canopy 1 is installed on the ring beam frame 102. That is, the louvered canopy 1 is installed on the first ring beams 2 of the ring beam frame 102. The louvered canopy 1 includes a plurality of louver boards 1a arranged in sequence as shown in FIG. 1.

Figure 4:
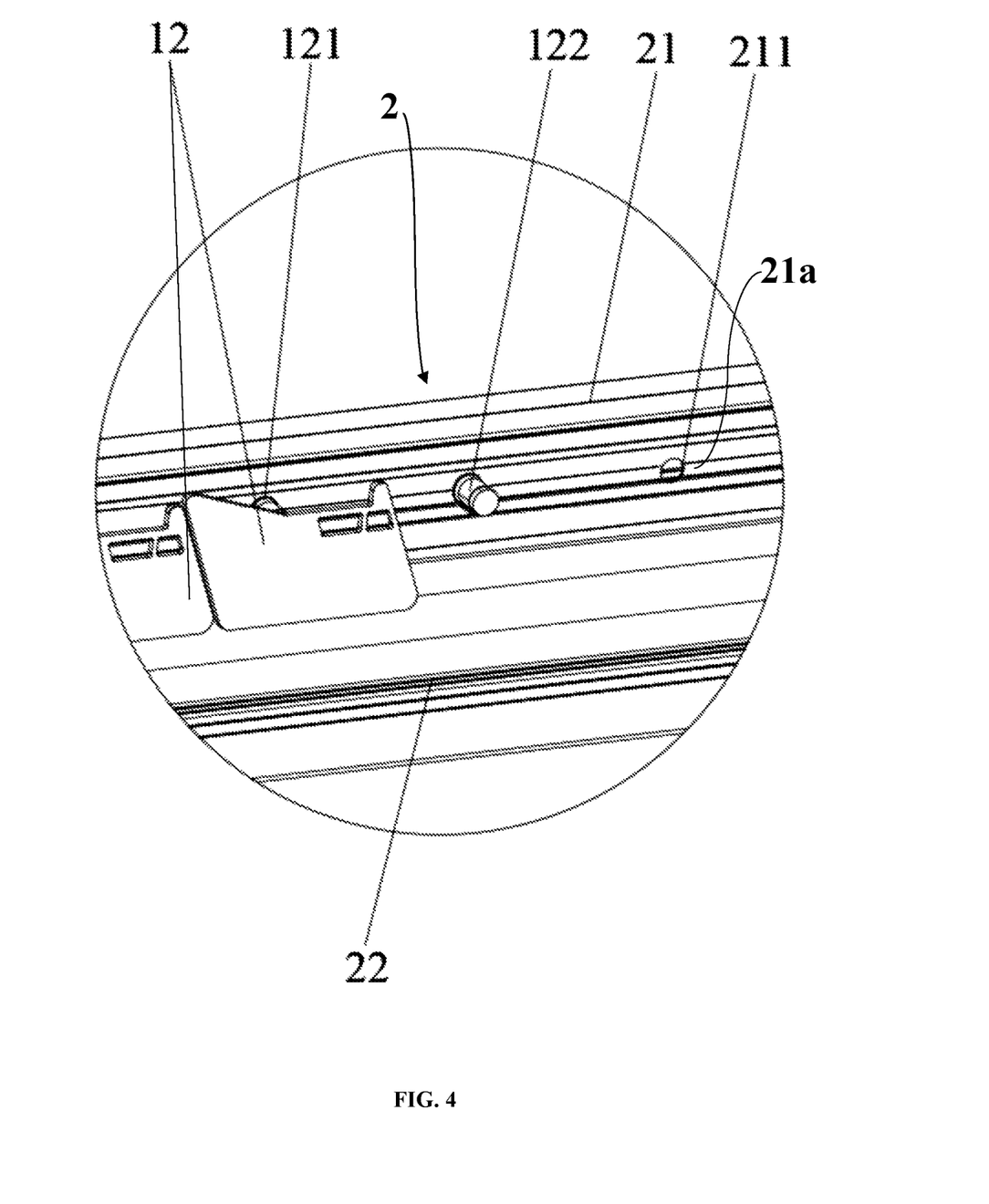
FIG. 4 is a structural diagram showing connecting pieces connected to a first ring beam of the multifunctional electric louvered awning.
Figure 6:
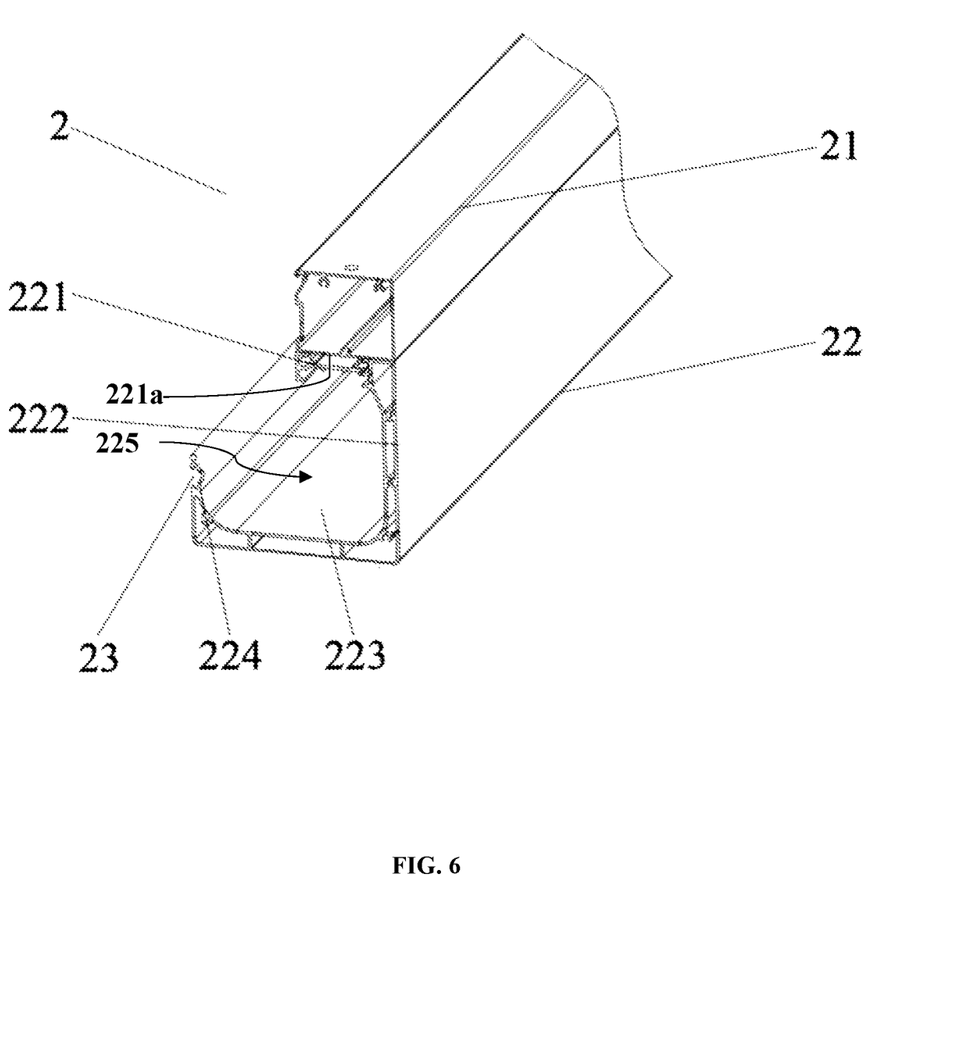
FIG. 6 is a structural diagram of the first ring beam of the multifunctional electric louvered awning.

In an embodiment, each of the first ring beams 2 includes a first upper ring beam 21 and a first lower ring beam 22 as shown in FIG. 4 and FIG. 6. The first upper ring beam 21 of each of the first ring beams 2 is configured to be installed in cooperation with the louver boards 1a of the louvered canopy 1. That is, the louver boards 1a are installed on the first upper ring beam 21 of each of the first ring beams 2. A layered ring beam structure design is adopted to facilitate the assembly of each component. As shown in FIG. 6, the first upper ring beam 21 is located on an upper part of the first lower ring beam 22. The louver boards 1a are installed on the first upper ring beam 21 of each of the first ring beams 2 to form a floating structure as shown in FIG. 2, thereby increasing a lower space and improving the assembly freedom between the components. In an embodiment, the first upper ring beam 21 and the first lower ring beam 22 are split structures and are connected to each other by fasteners, clamping grooves, sliding grooves, etc. In another embodiment, the first upper ring beam 21 and the first lower ring beam 22 are an integrally formed structure.

The louvered canopy 1 further comprises a drive assembly 201 for opening and closing the louver boards 1a as shown in FIG. 2. The drive assembly 201 is installed in the first lower ring beam 22. The drive assembly 201 includes a telescopic motor 14 and a linkage rod 13 as shown in FIG. 2. The linkage rod 13 is connected to a telescopic end of the telescopic motor 14. The linkage rod 13 is configured to link with the louver boards 1a. The telescopic end of the telescopic motor 14 connects to the linkage rod 13 through a connecting rod during installation. In an embodiment, the telescopic end of the telescopic motor 14 connects to a central position of the linkage rod 13 through a connecting rod.

Figure 7:
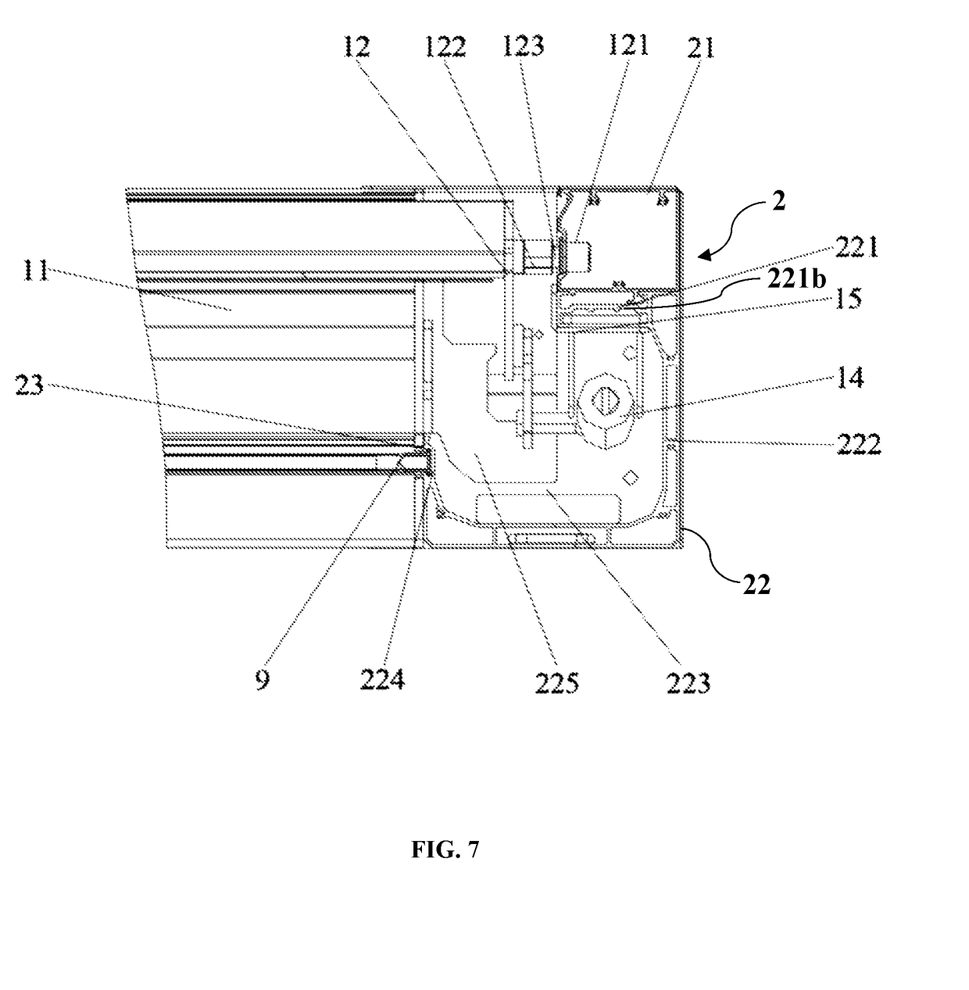
FIG. 7 is a sectional view of a louver board and the first ring beam of the multifunctional electric louvered awning.

The first lower ring beam 22 includes a clamping part 221, an outer wall 222, a bottom plate 223, and an inner wall 224 as shown in FIGS. 6-7. The first upper ring beam 21 is fixed to an upper surface 221a of the clamping part 221 of the first lower ring beam 22 as shown in FIG. 6. The telescopic motor 14 is suspended from a bottom surface 221b of the clamping part 221 of the first lower ring beam 22 through a mounting base 15 as shown in FIG. 2 and FIG. 7. The suspension structure design is adopted to protect the telescopic motor 14 from rainwater in an improved manner. An area of the first lower ring beam 22 can also be equipped with a controller 8, power supply components, etc. The clamping part 221, the outer wall 222, the bottom plate 223, and the inner wall 224 of the first lower ring beam 22 together form a drainage groove cavity 225 as shown in FIGS. 6-7. The height of the inner wall 224 is smaller than the height of the outer wall 222. The inner wall 224 is disposed proximal to a center of an end surface of the louver board body 11 of each of the louver boards 1a for facilitating drainage of the louver boards 1a.

In an embodiment, the inner wall 224 of the first ring beam 2 and/or the second ring beam 3 is provided with a light bar groove 23 for installing light emitting bodies 9 as shown in FIGS. 6-7. The light emitting bodies 9 are light bars electrically connected to a controller 8 installed on one of the ring beams such as the second ring beam 3 shown in FIG. 3, through wires. The light emitting bodies 9 are powered by power supply components. The power supply components can be connected to solar panels (not shown) located at the top of the awning frame 101.

Figure 5:
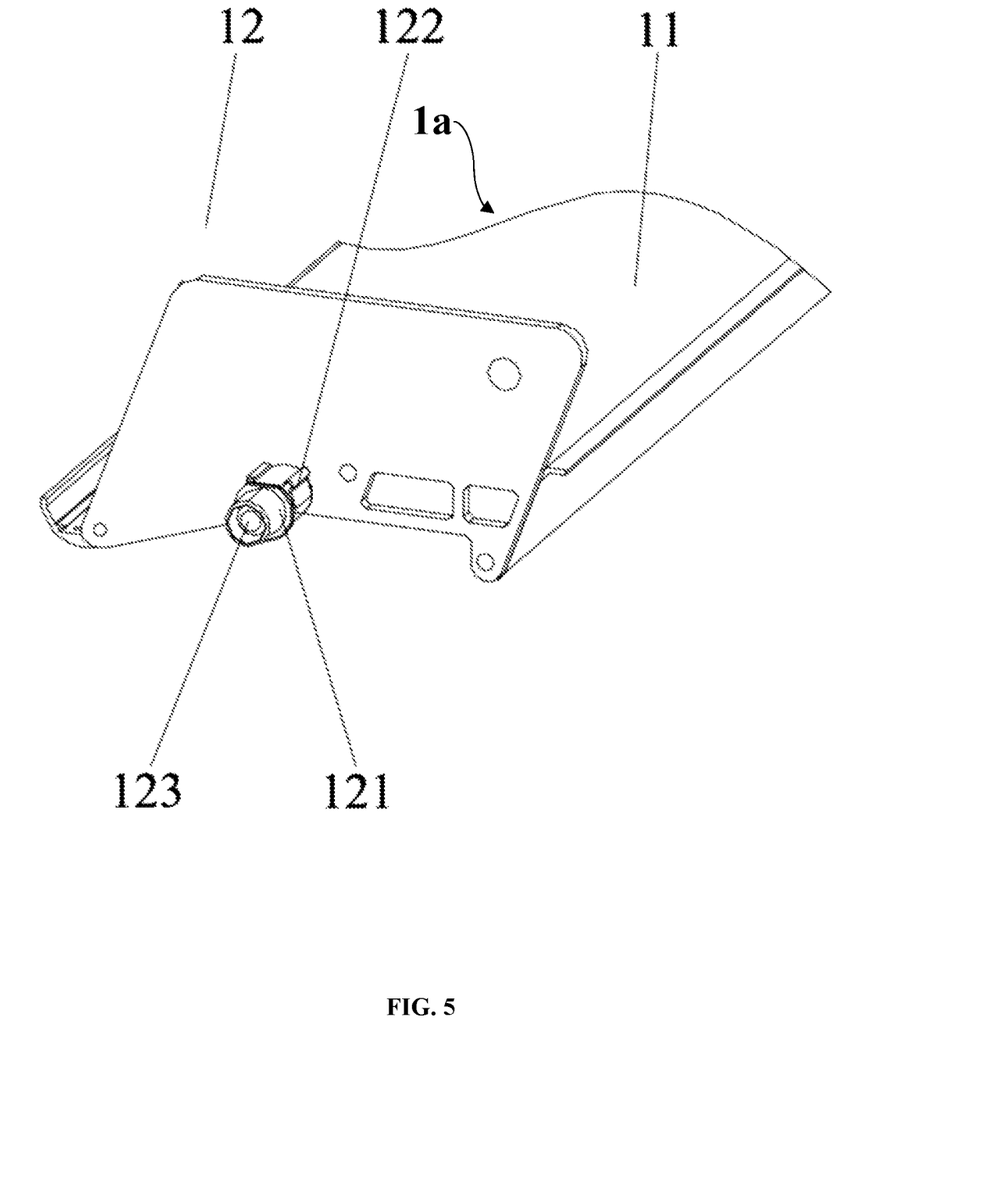
FIG. 5 is a structural diagram of a connecting piece of the multifunctional electric louvered awning.

In an embodiment, each of the louver boards 1a includes a louver board body 11 and connecting pieces 12 located at both ends of the louver board body 11 as shown in FIG. 2. Each connecting piece 12 is fixed to an end surface of the louver board body 11 through fasteners. Each connecting piece 12 is provided with a rotating shaft 123 fixed thereon as shown in FIG. 5. The rotating shaft 123 is sleeved with a shaft sleeve 121 as shown in FIG. 5. The shaft sleeve 121 is configured to cooperate with a rotating shaft hole 211 shown in FIG. 4. The rotating shaft hole 211 is installed on an inner wall 21a of the first upper ring beam 21 of each first ring beam 2 as shown in FIG. 4. The rotating shaft 123 is also provided with a clamping piece 122 as shown in FIGS. 4-5. The clamping piece 122 is mounted on the rotating shaft 123 and is configured to limit movement of each louver board 1a in an axial direction, and to complete an installation of each louver board in to the first upper ring beam 21 of each first ring beam 2 on both sides. As shown in FIG. 2, a plurality of connecting pieces 12 arranged in sequence is fixedly connected to the linkage rod 13. The linkage rod 13 is configured to cooperate with the telescopic motor 14. The telescopic motor 14 drives the linkage rod 13 to move, thereby driving the connecting piece 12 to move, and realizing the flipping of the louver boards 1a.

The louver boards 1a of the louvered canopy 1 are installed on the first upper ring beams 21 of the first ring beams 2 as follows. Each first upper ring beam 21 is provided with a plurality of rotating shaft holes 211 corresponding to the louver boards 1a. The end surface of each louver board body 11 is fixed with the connecting piece 12 through fasteners. The shaft sleeve 121 is sleeved on the rotating shaft 123 of each connecting piece 12. When the rotating shaft 123 sleeved with the shaft sleeve 121 at one end of each louver board 1a is inserted into a corresponding rotating shaft hole 211 of the first upper ring beam 21 of one first ring beam 2, the other end of the louver board 1a is set due to the length of the rotating shaft 123. Each louver board 1a is moved axially toward the assembled end surface, so that the rotating shaft 123 with the shaft sleeve 121 sleeved on the other end of the louver board 1a aligns with the corresponding rotating shaft hole 211 of the first upper ring beam 21 of the other first ring beam 2, and then moves toward the rotating shaft hole 211, allowing the shaft sleeve 121 to partially penetrate the rotating shaft hole 211, thereby completing the installation of the rotating shafts 123 sleeved with the shaft sleeves 121 to the rotating shaft holes 211 at both ends, so that the two ends of the louver boards 1a align with the rotating shaft holes 211. The louver boards 1a can move in an axial direction, causing the rotating shafts 123 sleeved with the shaft sleeves 121 to be easily disengaged from the rotating shaft holes 211. The optimized design includes the clamping piece 122, which is clamped on the rotating shaft 123 and cannot pass through the rotating shaft hole 211, so that the movement of each louver board 1a in the axial direction is limited, thereby completing the cooperative installation of the louver boards 1a to the first upper ring beams 21 of the first ring beams 2.

In an embodiment, the multifunctional electric louvered awning 100 also includes a rain sensor 5 as shown in FIGS. 1-2. The rain sensor 5 is installed on an outer surface of the awning frame 101. The rain sensor 5 is connected to the controller 8 shown in FIG. 3, by a wired connection or a wireless connection. The controller 8 is configured to control and drive the telescopic motor 14 of the drive assembly 201 shown in FIG. 2. The rain sensor 5 is configured to collect rainwater information and transmit the collected rainwater information signals to the controller 8. The controller 8 drives the telescopic motor 14 to operate according to the rainwater information signals transmitted by the rain sensor 5, thereby realizing the opening and closing of the louver boards 1a of the louvered canopy 1. The controller 8 can be an independent control module, or integrated in the rain sensor 5, or integrated in the telescopic motor 14.

When the louver boards 1a are in an open state, if the rain sensor 5 collects a rain signal, the rain sensor 5 transmits the rain signal to the controller 8 through the wired or wireless connection. The controller 8 performs signal conversion after receiving the rain signal and outputs a drive signal to the telescopic motor 14 of the drive assembly 201. The telescopic motor 14 then drives the linkage rod 13 of the drive assembly 201 to close each louver board 1a.

The rain sensor 5 is equipped with a rain sensor probe positioned outside the multifunctional electric louvered awning 100. The rain sensor probe performs rain data collection. The rain sensor 5 can be installed on the top or outside of the ring beams 2 and 3 of the multifunctional electric louvered awning 100. The rain sensor 5 installed on the top of the ring beams 2 and 3 conveniently and effectively collects more accurate rain signals. In addition, the rain sensor 5 can also be installed on the outside of the leg pipes 4 of the awning frame 101.

The multifunctional electric louvered awning 100 also includes a power supply (not shown) configured to supply power to the controller 8 and/or the rain sensor 5. In an embodiment, the power supply and the controller 8 are integrated as a single unit and installed in the rain sensor 5. In this embodiment, a solar panel can be added to supply power to the power supply.

In another embodiment, the power supply is detachably installed on the mounting base 15 or on the ring beams 2 and 3. In an embodiment, the power supply is a quick-release power supply configured to be quickly installed and disassembled, and also to provide power to the controller 8, the light emitting bodies 9, and other components.

A solar panel can also be configured. The solar panel adopts a solar panel seat commonly used for outdoor products, such as the solar seat disclosed in Chinese patent publication number CN202739028U, or the solar panel quick-mounting structure for outdoor products disclosed in Chinese patent publication number CN213072509U, which is configured to charge power components conveniently. In another embodiment, the power supply and the controller 8 is divided into two parts, such that the power supply can be integrated with the solar panel in one part, and connected to the controller 8 and other components through wires for supplying power.

In addition, both the rain sensor 5 and the controller 8 can include a built-in wireless communication module for wireless signal intercommunication between components. The wireless communication module adopts wireless communication protocols of Wi-Fi, Bluetooth, and ZigBee, as well as GPRS mobile communication and the like, among which, Bluetooth wireless communication is preferred. The rain sensor 5 can be installed freely at any position in the multifunctional electric louvered awning 100 and operates using wireless communication, thereby providing a higher degree of freedom to the overall design.

In this embodiment, the rain sensor 5 is configured to collect a rain signal and transmit the rain signal to the controller 8 for data conversion. Combined with the transmission structure of the telescopic motor 14 and the linkage rod 13, the controller 8 controls the closing of each louver board 1a of the louvered canopy 1 based on the rain signal, improves the closing and opening of the louver boards 1a in the louvered canopy 1, and improves user experience.

In another embodiment, the controller 8 and the power supply are installed in the second ring beam 3. The second ring beams 3 and the louver boards 1a are arranged in parallel. The rainwater in the louver boards 1a passes through the two ends, flows into the first ring beams 2, and drains through the drainage groove cavity 225 shown in FIGS. 6-7. The second ring beams 3 usually do not need to undertake the drainage operation, because the controller 8 and the power supply are conveniently installed inside the second ring beams 3.

Figure 3:
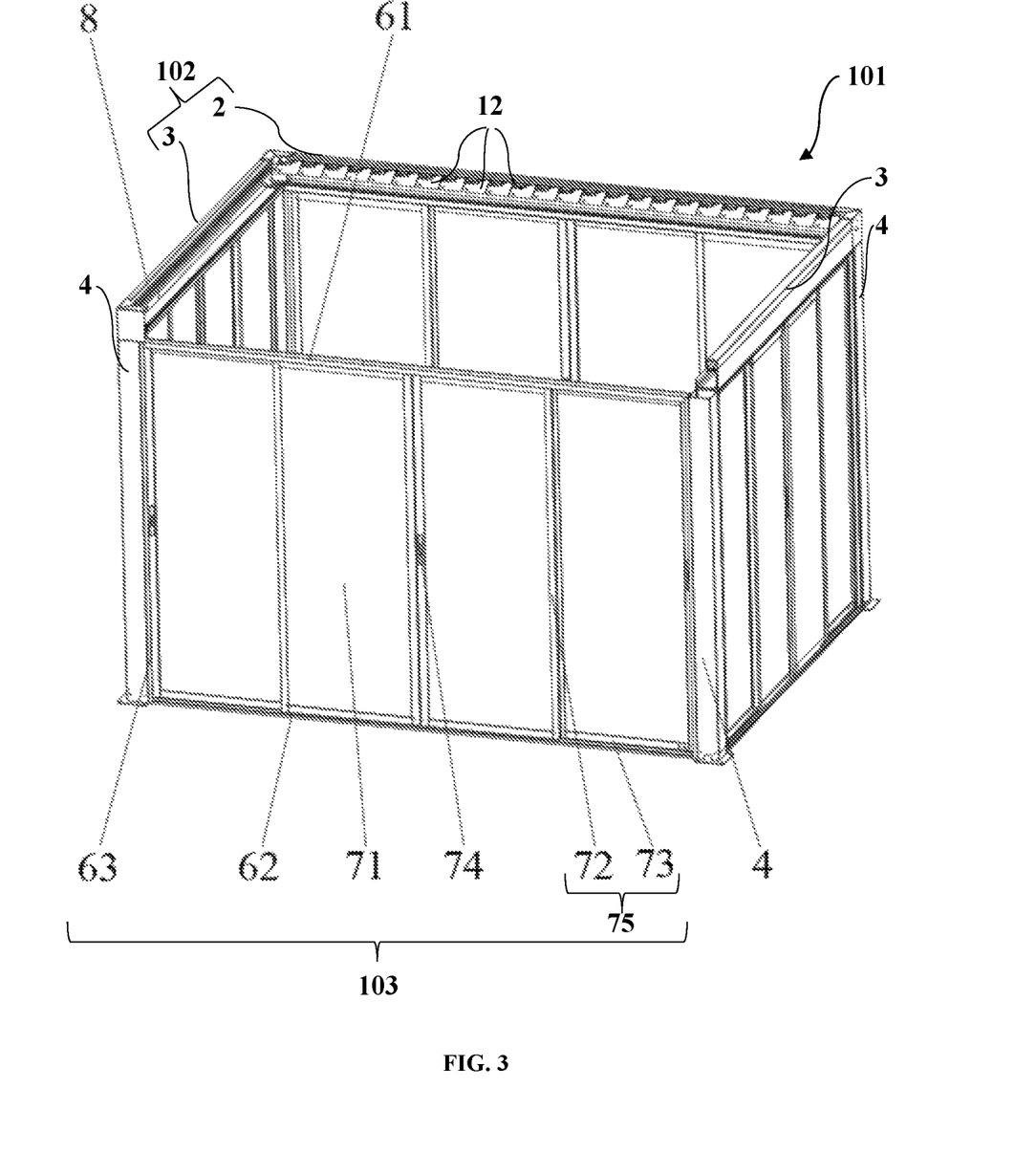
FIG. 3 is a structural diagram of an awning frame and a door frame assembly of the multifunctional electric louvered awning.

In an embodiment, the multifunctional electric louvered awning 100 also includes a door frame assembly 103 as shown in FIG. 1 and FIG. 3. The door frame assembly 103 includes a door frame unit 6 and a door panel unit 7 installed on the door frame unit 6 as shown in FIG. 1. The door frame unit 6 includes a sky rail 61 at an upper end of the door frame unit 6, a ground rail 62 at a bottom end of the door frame unit 6, and side frames 63 on both sides of the door frame unit 6 as shown in FIG. 3. The side frames 63 of the door frame unit 6 are fixedly matched with the leg pipes 4 of the awning frame 101 through fasteners. The door panel unit 7 is configured to slide along the sky rail 61 and the ground rail 62 of the door frame unit 6. The door panel unit 7 includes a door panel frame 75 and a door panel body 71 installed in the door panel frame 75 as shown in FIG. 3. The door panel frame 75 includes a door panel horizontal frame 73 and a door panel vertical frame 72. The door panel horizontal frame 73 is configured to slide and fit with the sky rail 61 and/or the ground rail 62 of the door frame unit 6. The door panel unit 7 also includes a door lock 74 provided between two adjacent door panel vertical frames 72. By adding the door frame assembly 103 at the sides, the inner space of the multifunctional electric louvered awning 100 forms a closed space, which increases privacy of the interior, and can effectively prevent rainwater from entering the inner space or can effectively form a sunshade.

The sliding cooperation between the door panel horizontal frame 73 and the sky rail 61 and/or the ground rail 62 is realized by adopting a conventional pulley structure design or a chute slide-rail structure design used in existing sliding door structures. The door panel body 71 is made of glass door panels, sunshade cloth door panels, etc.

The present invention optimizes the design of the awning frame structure, adds different functional installation areas, adopts upper and lower ring beam assembly structures, facilitates the assembly of the louvered canopy 1, increases the overall height of the ring beams 2 and 3, and increases the assembly space of other components. Moreover, the telescopic motor 14 is assembled with a suspension structure, which protects the telescopic motor 14 from rainwater and increases the protection effect. Furthermore, the light bar groove 23 facilitates the installation of the light emitting bodies 9 and improves the light sensation inside the multifunctional electric louver awning 100. With the door frame assembly 103, a closed space can be formed to improve usability.

The above is only an embodiment of the present invention and does not limit the present invention in any form. Any revisions, equivalent changes, or modifications made to the above embodiments according to the technical principle of the present invention, belong to the scope of the technical scheme of the present invention.

We claim:

1. A multifunctional electric louvered awning comprising:
an awning frame including a ring beam frame and a plurality of leg pipes for supporting the ring beam frame, wherein the ring beam frame comprises:
first ring beams, wherein each of the first ring beams includes a first upper ring beam and a first lower ring beam, wherein the first lower ring beam includes a clamping part, an outer wall, a bottom plate, and an inner wall, and wherein the first upper ring beam is fixed to an upper surface of the clamping part of the first lower ring beam;
second ring beams configured to connect the first ring beams on both sides of the first ring beams; and
a louvered canopy installed on the first ring beams of the ring beam frame of the awning frame, wherein the louvered canopy comprises:
a plurality of louver boards arranged in sequence, wherein the louver boards are installed on the first upper ring beam of each of the first ring beams; and
a drive assembly installed in the first lower ring beam for opening and closing the louver boards, wherein the drive assembly includes:
a telescopic motor suspended from a bottom surface of the clamping part of the first lower ring beam through a mounting base; and
a linkage rod connected to a telescopic end of the telescopic motor, wherein the linkage rod is configured to link with the plurality of louver boards.

2. The multifunctional electric louvered awning according to claim 1, wherein one or more of the inner wall of the first ring beam and an inner wall of the second ring beam is provided with a light bar groove for installing light emitting bodies.

3. The multifunctional electric louvered awning according to claim 1, wherein the clamping part, the outer wall, the bottom plate, and the inner wall of the first lower ring beam together form a drainage groove cavity, wherein a height of the inner wall is smaller than a height of the outer wall, and wherein the inner wall is disposed proximal to a center of an end surface of a louver board body of each of the louver boards.

4. The multifunctional electric louvered awning according to claim 1, wherein each of the louver boards comprises a louver board body and connecting pieces located at both ends of the louver board body, wherein each of the connecting pieces is provided with a rotating shaft and a shaft sleeve sleeved on the rotating shaft, wherein the shaft sleeve is configured to cooperate with a rotating shaft hole installed on the inner wall of the first upper ring beam of each of the first ring beams.

5. The multifunctional electric louvered awning according to claim 4, further comprising a clamping piece mounted on the rotating shaft, wherein the clamping piece is configured to limit movement of each of the louver boards in an axial direction, and the louver boards are installed on the first upper ring beam of each of the first ring beams on both sides.

6. The multifunctional electric louvered awning according to claim 1, further comprising a rain sensor installed on an outer surface of the awning frame, wherein the rain sensor is connected to a controller by one of a wired connection and a wireless connection, wherein the controller is configured to control and drive the telescopic motor of the drive assembly.

7. The multifunctional electric louvered awning according to claim 1, further comprising a door frame assembly including a door frame unit and a door panel unit installed on the door frame unit, wherein the door frame unit includes a sky rail on an upper end of the door frame unit, a ground rail on a bottom end of the door frame unit, and side frames on both sides of the door frame unit, and wherein the door panel unit is configured to slide along the sky rail and the ground rail of the door frame unit.

8. The multifunctional electric louvered awning according to claim 7, wherein the door panel unit includes a door panel frame and a door panel body installed in the door panel frame, wherein the door panel frame includes a door panel horizontal frame and a door panel vertical frame, wherein the door panel horizontal frame is configured to slide within one or more of the sky rail and the ground rail of the door frame unit.

9. The multifunctional electric louvered awning according to claim 8, wherein the door panel unit further comprises a door lock provided between the door panel vertical frames that are adjacent to each other.

10. The multifunctional electric louvered awning according to claim 7, wherein the side frames of the door frame unit are fixedly matched with the leg pipes of the awning frame through fasteners.

* * * * *